United States Patent
Kobayashi

(10) Patent No.: US 11,108,924 B2
(45) Date of Patent: Aug. 31, 2021

(54) IMAGE FORMING APPARATUS

(71) Applicant: TOSHIBA TEC KABUSHIKI KAISHA, Tokyo (JP)

(72) Inventor: Yasukazu Kobayashi, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/033,300

(22) Filed: Sep. 25, 2020

(65) Prior Publication Data

US 2021/0211548 A1 Jul. 8, 2021

(30) Foreign Application Priority Data

Jan. 8, 2020 (JP) .............................. JP2020-001639

(51) Int. Cl.
*H04N 1/00* (2006.01)

(52) U.S. Cl.
CPC ....... *H04N 1/0044* (2013.01); *H04N 1/00334* (2013.01); *H04N 1/00464* (2013.01); *H04N 1/00493* (2013.01); *H04N 2201/0094* (2013.01)

(58) Field of Classification Search
CPC ............. G03G 15/5087; G03G 15/502; G03G 15/5083; G03G 2215/00109; G03G 15/5062; G03G 15/6538; G03G 15/6582; G03G 21/00; G03G 2215/00818; G03G 2215/00827; G06K 19/06037; G06K 2209/01; G06K 7/1417; G06K 9/0042; H04N 1/0044; H04N 1/00334; H04N 1/00493; H04N 1/00464; H04N 2201/0094

USPC ....................................................... 358/1.001
See application file for complete search history.

(56) References Cited

U.S. PATENT DOCUMENTS

| | | | | |
|---|---|---|---|---|
| 2008/0247655 A1* | 10/2008 | Yano | .................. | H04N 1/41 382/232 |
| 2008/0263134 A1 | 10/2008 | Machida | | |
| 2009/0175495 A1* | 7/2009 | Kamei | ............... | H04N 1/00448 382/100 |
| 2009/0265625 A1* | 10/2009 | Tamai | ................ | H04N 1/00408 715/274 |
| 2010/0077379 A1* | 3/2010 | Sugishita | ................ | G06F 9/451 717/106 |
| 2011/0292444 A1* | 12/2011 | Koarai | .................. | G06F 3/1285 358/1.15 |
| 2012/0250061 A1* | 10/2012 | Takami | ................... | G06T 11/00 358/1.13 |

(Continued)

FOREIGN PATENT DOCUMENTS

| | | | |
|---|---|---|---|
| JP | 2013-206026 A | 10/2013 | |
| JP | 2014-007483 A | 1/2014 | |

(Continued)

OTHER PUBLICATIONS

Extended European Search Report dated Apr. 12, 2021 issued in European Patent Application No. 20205526.5, ten (10) pages.

*Primary Examiner* — Negussie Worku
(74) *Attorney, Agent, or Firm* — Foley & Lardner LLP

(57) ABSTRACT

An image forming apparatus includes a processor configured to create a preview image of an image created by executing a job; store image data of the created preview image in a memory; create an information code representing a storage area of the memory where the image data is stored; and display the information code created by the processor on a display.

13 Claims, 7 Drawing Sheets

(56) References Cited

U.S. PATENT DOCUMENTS

| | | | |
|---|---|---|---|
| 2013/0208300 A1 | 8/2013 | Sakura | |
| 2014/0358681 A1* | 12/2014 | Satoh | G06Q 30/0267 705/14.53 |
| 2015/0116733 A1* | 4/2015 | Takada | B41J 2/01 358/1.2 |
| 2016/0065781 A1* | 3/2016 | Um | H04N 1/32106 358/1.15 |
| 2016/0162767 A1* | 6/2016 | Ito | G06K 19/06037 235/494 |
| 2016/0255242 A1 | 9/2016 | Osadchyy et al. | |
| 2017/0094101 A1 | 3/2017 | Saito | |
| 2017/0153378 A1* | 6/2017 | Lee | G02B 6/005 |
| 2018/0013916 A1 | 1/2018 | Koujimoto et al. | |
| 2019/0026055 A1* | 1/2019 | Nishida | G06F 3/1204 |
| 2020/0076986 A1* | 3/2020 | Sakiyama | H04N 1/4453 |
| 2020/0314254 A1* | 10/2020 | Iwasaki | G06F 3/1203 |
| 2021/0021719 A1* | 1/2021 | Kobayashi | H04N 1/00238 |

FOREIGN PATENT DOCUMENTS

| | | |
|---|---|---|
| JP | 2015-143779 A | 8/2015 |
| JP | 2017-113960 A | 6/2017 |
| JP | 2018-160900 A | 10/2018 |
| JP | 2019-064214 A | 4/2019 |

\* cited by examiner

IMAGE FORMING APPARATUS

CROSS-REFERENCE TO RELATED APPLICATION

This application is based upon and claims the benefit of priority from Japanese Patent Application No. 2020-001639, filed Jan. 8, 2020, the entire contents of which are incorporated herein by reference.

FIELD

Embodiments described herein relate generally to an image forming apparatus.

BACKGROUND

A multifunction peripheral (multifunction peripheral/printer/product) that displays a preview image of a document on a control panel is known (for example, see JP-A-2017-113960). For example, when a received job is a specific job and the state of a user carrying a terminal device is a first state, the image forming apparatus displays the preview image of the image output by this job on the terminal device. When the user's state is a second state different from the first state, the preview image is displayed on the touch panel display of the image forming apparatus itself. That is, the MFP displays the preview image on the control panel before printing or before transmitting the image to the outside by FAX or Email. The user can confirm the document by displaying the preview image on the control panel.

The MFP may not have the function of displaying the preview image of the document on the control panel. Further, depending on the size of the control panel, the preview image displayed may be small or the document preview image may not be displayed. Therefore, the user may not be able to check the document before printing or transmitting.

DETAILED DESCRIPTION

Figure 1:
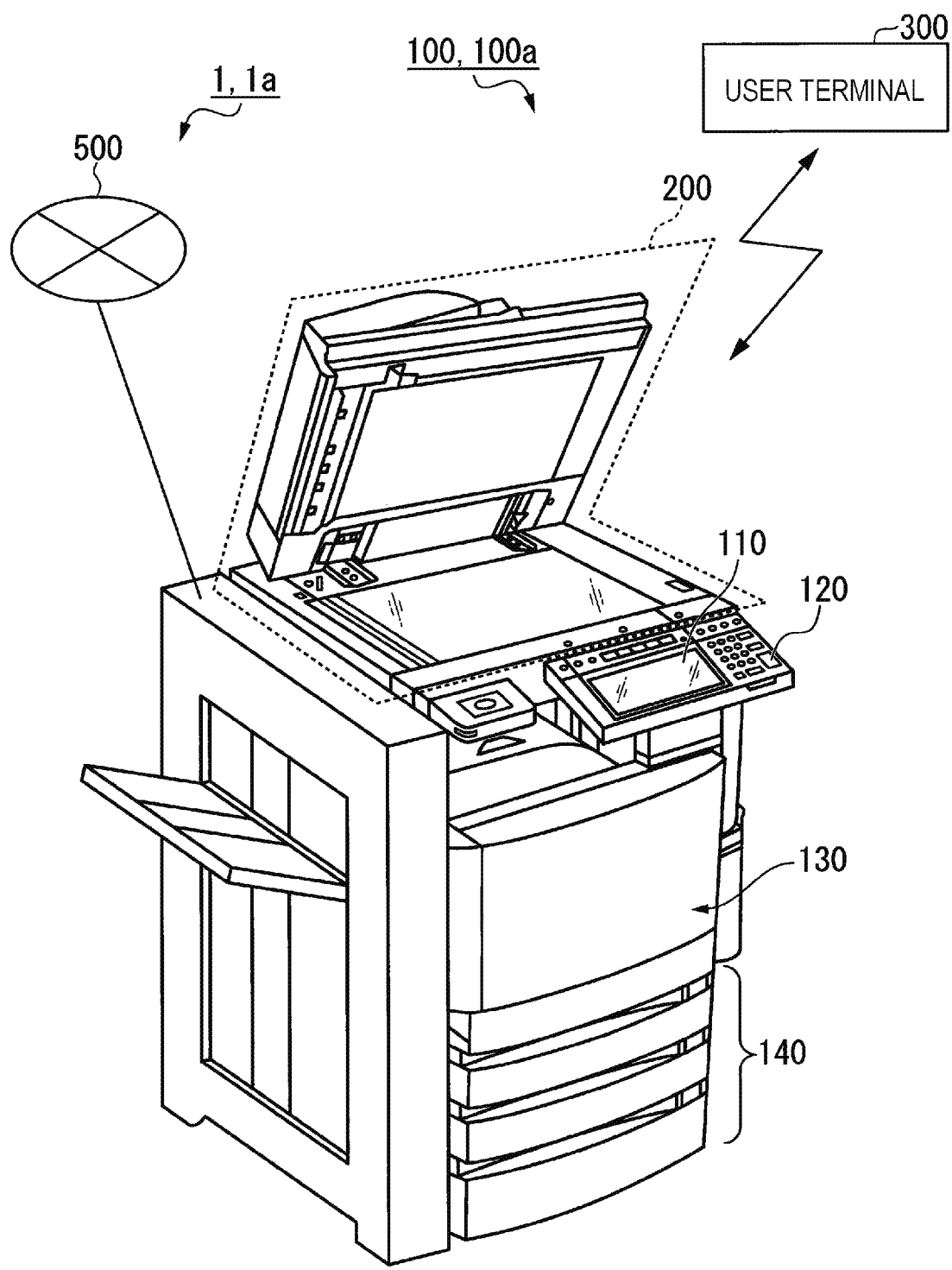
FIG. 1 is a diagram showing a system configuration of an image forming system according to at least one embodiment.

The present disclosure provides an image forming apparatus capable of confirming the content of an image before printing and transmitting.

In general, according to at least one embodiment, the image forming apparatus includes a processing unit, a creating unit, and an output unit. The processing unit creates a preview image of the image created by executing a job and stores image data of the created preview image in a storage unit. The creating unit creates an information code representing a storage area of the storage unit where the image data is stored. The output unit displays the information code created by the creating unit on a display unit.

According to at least one embodiment, an image forming apparatus includes a processor configured to create a preview image of an image created by executing a job; store image data of the created preview image in a memory storage; create an information code representing a storage area of the memory storage where the image data is stored; and display the information code created by the processor on a display.

The image forming apparatus of at least one embodiment will be described below with reference to the drawings. The embodiments described below are merely examples and the embodiments to which the present disclosure is applied are not limited to the following embodiments.

In all the drawings for illustrating the embodiments, the same reference numerals are used for those having the same functions and repeated descriptions will be omitted.

FIG. 1 is a diagram showing a system configuration of an image forming system 1 of at least one embodiment. The image forming system 1 includes an image forming apparatus 100. In FIG. 1, a user terminal 300 is shown in addition to the image forming apparatus 100. The image forming apparatus 100 and the user terminal 300 are communicably connected via a network 500.

The image forming apparatus 100 is an apparatus that forms an image using a consumable item. The image forming apparatus 100 may be, for example, a multifunction peripheral. A multifunction peripheral is an apparatus that has multiple functions. For example, the multifunction peripheral is an office apparatus having functions such as a printer, an image scanner, and a facsimile.

The image forming apparatus 100 scans a document to create image data in a file format related to an electronic document such as a portable document format (PDF). The image forming apparatus 100 creates a preview image of the image based on the created image data. The preview image refers to a sample that was reduced to improve visibility when displaying an image or a printed matter page. The image forming apparatus 100 stores the image data of the created image and the image data of the preview image in association with each other. Hereinafter, the image data of the preview image may be referred to as preview image data.

The image forming apparatus 100 acquires a URL indicating a storage destination folder such as a storage area of a storage unit where preview image data is stored, and a file name. The image forming apparatus 100 creates a two-dimensional information code representing the acquired URL. The image forming apparatus 100 displays the created two-dimensional information code on the display.

The user terminal 300 includes an imaging unit. The imaging unit reads the two-dimensional information code displayed on the display of the image forming apparatus 100 and the user terminal 300 acquires the URL included in the two-dimensional information code read by the imaging unit.

The user terminal 300 uses the acquired URL to create a preview image request for requesting a preview image to the image forming apparatus 100. The user terminal 300 transmits the created preview image request to the image forming apparatus 100.

The image forming apparatus 100 receives the preview image request transmitted by the user terminal 300. The image forming apparatus 100 creates a preview screen for providing an image corresponding to the preview image based on the received preview image request. The image forming apparatus 100 creates a preview screen notification including the screen data of the created preview screen and addressed to the user terminal 300. The image forming apparatus 100 transmits the created preview screen notification to the user terminal 300.

The user terminal 300 receives the preview screen notification transmitted by the image forming apparatus 100. The user terminal 300 displays the preview screen by processing the screen data of the preview screen included in the received preview screen notification.

The user instructs subsequent processing such as acquiring an image corresponding to the preview image, with reference to the preview screen displayed on the user terminal 300. The user terminal 300 creates an image data acquisition request addressed to the image forming apparatus 100, including identification information such as the file name of the image data of the corresponding image of the preview image, based on instructing the subsequent processing of the user. The user terminal 300 transmits the created image data acquisition request to the image forming apparatus 100.

The image forming apparatus 100 receives the image data acquisition request transmitted by the user terminal 300. The image forming apparatus 100 acquires the image data corresponding to the file name included in the received image data acquisition request. The image forming apparatus 100 creates an image data acquisition response including the acquired image data and addressed to the user terminal 300. The image forming apparatus 100 transmits the created image data acquisition response to the user terminal 300.

The user terminal 300 receives the image data acquisition response transmitted by the image forming apparatus 100. The user terminal 300 acquires the image data included in the received image data acquisition response. The user terminal 300 displays the document by processing the acquired image data.

Each device will be described below in detail.

Figure 2:
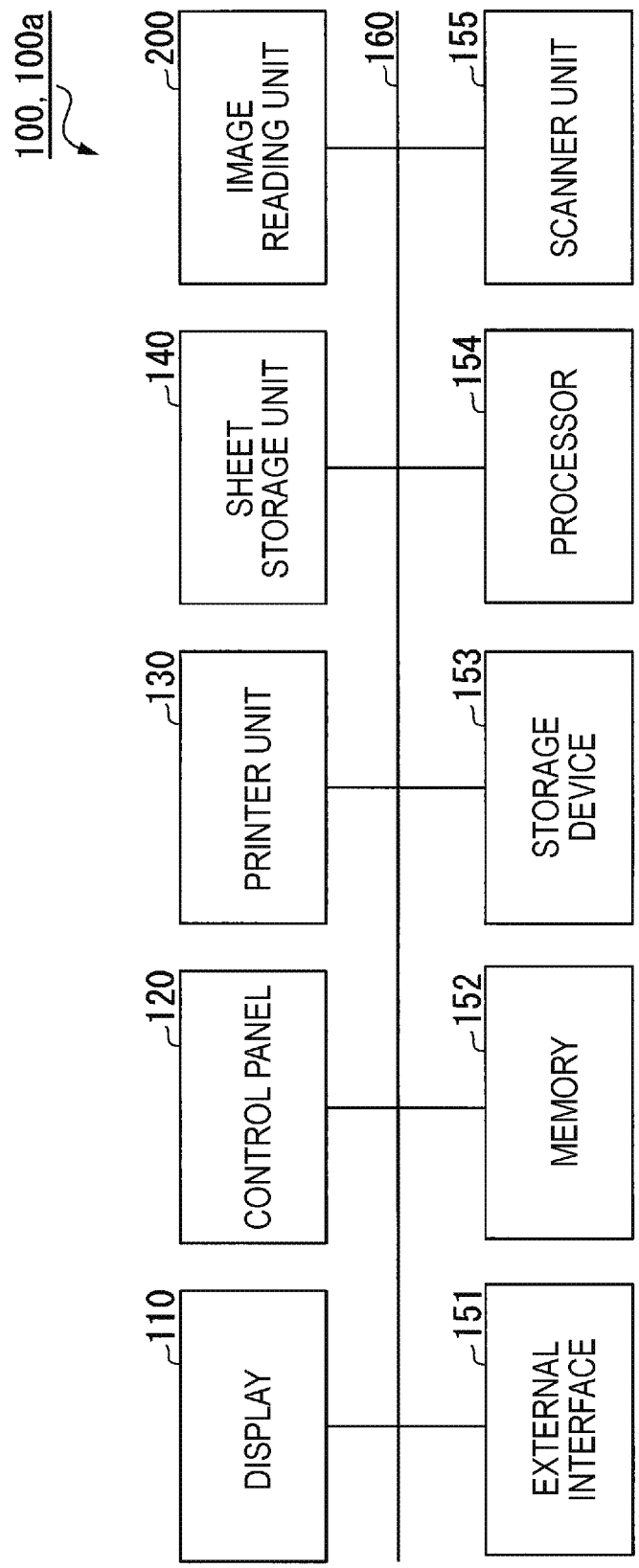
FIG. 2 is a hardware block diagram of an image forming apparatus according to at least one embodiment.

FIG. 2 is a diagram showing an example of a hardware configuration of the image forming apparatus 100 according to the embodiment. First, the image forming apparatus 100 will be described in detail with reference to FIGS. 1 and 2.

The image forming apparatus 100 forms an image on a sheet using a developer such as a toner or ink. When the developer is a toner, the developer is heated and fixed on the sheet. When the developer is ink, the developer is dropped on the sheet to form an image on the sheet. The sheet is, for example, paper or label sheet. The sheet may be any sheet as long as the image forming apparatus 100 can form an image on the surface thereof. Examples of toner include decolorable toner, non-decolorable toner (normal toner), and decorative toner. The developer is one specific example of a consumable item used in the image forming apparatus 100.

The image forming apparatus 100 may include a display 110, a control panel 120, a printer unit 130, a sheet storage unit 140, an external interface 151, a memory 152, a storage device 153, a processor 154, a scanner unit 155, and an image reading unit 200. The printer unit 130 of the image forming apparatus 100 may be a device that fixes a toner image or an inkjet type device. The functional units are connected via a system bus 160 so that data communication is possible.

The display 110 is an image display device such as a liquid crystal display or an organic electro luminescence (EL) display. The display 110 displays various information regarding the image forming apparatus 100.

The control panel 120 includes a plurality of buttons. The control panel 120 receives user operations. The control panel 120 outputs an operation signal according to the operation performed by the user to the processor 154 of the image forming apparatus 100. The display 110 and the control panel 120 may be configured as an integrated touch panel.

The printer unit 130 may form an image on a sheet based on the image data generated by the image reading unit 200 or the image data received via the communication path. The printer unit 130 forms an image by the following processing, for example. The image forming unit of the printer unit 130 forms an electrostatic latent image on the photosensitive drum based on the image data. The image forming unit of the printer unit 130 forms a visible image by attaching the developer to the electrostatic latent image. The transfer unit of the printer unit 130 transfers the visible image onto a sheet. The fixing unit of the printer unit 130 fixes the visible image on the sheet by heating and pressing the sheet. The sheet on which the image is formed may be a sheet accommodated in the sheet storage unit 140 or may be a manually fed sheet.

The sheet storage unit 140 stores sheets to be used for image formation in the printer unit 130.

The external interface 151 is configured using a communication interface. The external interface 151 communicates with other devices such as the user terminal 300 by wire or wirelessly via the network 500 according to a predetermined protocol. Specifically, the external interface 151 acquires the preview image request transmitted by the user terminal 300. The external interface 151 transmits the preview image notification output by the processor 154 to the user terminal 300. The external interface 151 acquires the image data acquisition request transmitted by the user terminal 300. The external interface 151 transmits the image data acquisition response output by the processor 154 to the user terminal 300.

The memory 152 temporarily stores data to be used by each functional unit of the image forming apparatus 100. The memory 152 is, for example, a random access memory (RAM). The memory 152 stores data required when the image forming apparatus 100 operates. The memory 152 may temporarily store the digital data generated by the image reading unit 200. The memory 152 may temporarily store the image data formed in the image forming apparatus 100 and the preview image data.

The storage device 153 is configured using a storage device such as a magnetic hard disk device or a semiconductor storage device. The storage device 153 stores a software program and data required when the image forming apparatus 100 operates.

The processor 154 controls the operation of each functional unit of the image forming apparatus 100. The processor 154 loads the software program stored in the storage device 153 onto the memory 152 and executes the loaded software program to execute processing. The processor 154 acquires the image data output by the scanner unit 155 and creates a preview image based on the acquired image data. The processor 154 stores the created image data and the preview image data in the memory 152, outputs the image data to the printer unit 130, or transmits the image data and the preview image data to another device via the external interface 151.

The scanner unit 155 reads images such as characters, figures, and photographs drawn on a sheet placed at a predetermined position. The scanner unit 155 includes an imaging element. A charge-coupled device (CCD) system, a contact image sensor (CIS) system, or another system may be used for the scanner unit 155. The scanner unit 155 generates image data based on the read image. The scanner unit 155 outputs the generated image data to the processor 154.

The image reading unit 200 reads an image to be read based on brightness and darkness. The image reading unit 200 records image data obtained by being read. The recorded image data may be image-formed on the sheet by the printer unit 130.

Figure 3:
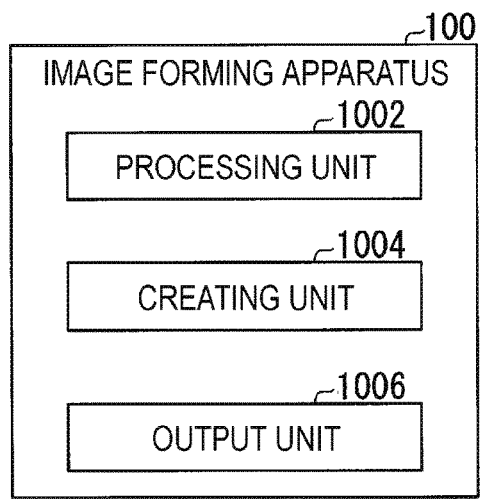
FIG. 3 is a diagram showing an example of a software configuration of the image forming apparatus according to at least one embodiment.

FIG. 3 is a diagram showing an example of a software configuration of the image forming apparatus 100 according to the embodiment. The software configuration shown in FIG. 3 is realized by the processor 154 of the image forming apparatus 100 processing the software program stored in the storage device 153 of the image forming apparatus 100.

The processor 154 of the image forming apparatus 100 functions as a processing unit 1002, a creating unit 1004, and an output unit 1006.

The processing unit 1002 causes the scanner unit 155 to execute a scan job or the printer unit 130 to execute a print job based on an operation performed by the user on the control panel 120. The processing unit 1002 acquires the image data created by the scanner unit 155 by executing the scan job.

The processing unit 1002 creates a preview image based on the acquired image data. The processing unit 1002 stores the image data of the image and the image data of the preview image in association with each other in the storage device 153.

The processing unit 1002 acquires information indicating a storage area where the image data of the preview image stored in the storage device 153 is stored. Here, a description will be continued regarding a case where a URL is applied as an example of information indicating a storage area where image data of a preview image is stored. The URL may indicate the storage destination folder where the image data of the preview image is stored and the file name. Hereinafter, as an example, the case where the storage destination folder where the uploaded image data is stored, and the file name are indicated by the URL will be described.

The creating unit 1004 creates a two-dimensional information code such as a QR code (registered trademark), or a one-dimensional information code such as a barcode representing the URL acquired by the processing unit 1002. A description follows regarding a case where the creating unit 1004 creates a two-dimensional information code representing the URL.

The output unit 1006 acquires the two-dimensional information code created by the creating unit 1004. The output unit 1006 outputs the acquired two-dimensional information code to the display 110.

The display 110 acquires the two-dimensional information code output by the output unit 1006 and displays the acquired two-dimensional information code.

The processing unit 1002 acquires a preview image request from the external interface 151. The processing unit 1002 acquires preview image data that can be accessed by the URL, based on the URL specified in the acquired preview image request. The processing unit 1002 creates a preview screen for providing the acquired preview image data.

The creating unit 1004 acquires the preview screen data created by the processing unit 1002. The creating unit 1004 creates a preview screen notification including the acquired preview screen data and addressed to the user terminal 300 that transmitted the preview image request. The creating unit 1004 outputs the created preview screen notification to the external interface 151.

The processing unit 1002 acquires an image data acquisition request from the external interface 151. The processing unit 1002 acquires the corresponding image data from the storage device 153 based on identification information such as the file name of the image data specified by the acquired image data acquisition request.

The creating unit 1004 acquires the image data acquired by the processing unit 1002. The creating unit 1004 creates an image data acquisition response including the acquired image data and addressed to the user terminal 300 that transmitted the image data acquisition request. The creating unit 1004 outputs the created image data acquisition response to the external interface 151.

After the creating unit 1004 outputs the image data acquisition response to the external interface 151, the output unit 1006 stops outputting the two-dimensional information code corresponding to the image data included in the image data acquisition response.

Figure 4:
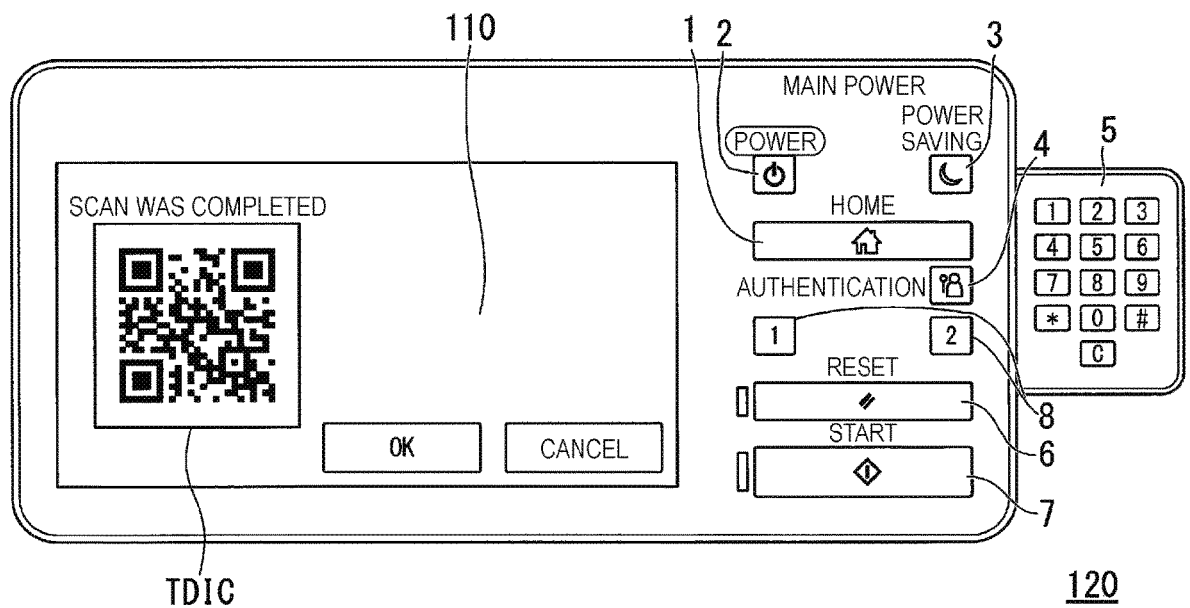
FIG. 4 is a diagram showing an example of a display of the image forming apparatus according to at least one embodiment.

FIG. 4 is a diagram showing an example of the display 110 of the image forming apparatus 100 according to the embodiment. In addition to the display 110, the control panel 120 is also shown in FIG. 4.

The display 110 is configured of a touch panel. A two-dimensional information code TDIC, an OK button, and a cancel button are displayed on the display 110.

The control panel 120 includes a home button 1, a power button 2, a power saving button 3, an authentication button 4, a numeric keypad 5, a reset button 6, a start button 7, and a function button 8.

The home button 1 is pressed when the home screen is displayed on the display 110. The power button 2 is pressed when the power of the image forming apparatus 100 is turned on or off. The power saving button 3 is pressed to shift the image forming apparatus 100 from the normal mode to the power saving mode or to restore the image forming apparatus 100 from the power saving mode to the normal mode.

The authentication button 4 is pressed when logging in to the image forming apparatus 100. When the user presses the authentication button 4, an authentication screen is displayed on the display 110. The authentication screen includes a box for inputting a user ID and a box for inputting a password. The user inputs the user ID in the box for inputting a user ID and the password in the box for inputting a password by using the numeric keypad 5 described later. The control panel 120 outputs the combination of the user ID and the password input by the user to the processing unit 1002. The processing unit 1002 authenticates the user based on the combination of the user ID and the password output by the control panel 120 and outputs the authentication result to the control panel 120.

The numeric keypad 5 is pressed when inputting numbers, or the like. The reset button 6 is pressed when releasing all the selected functions and restoring to the initial settings. The start button 7 is pressed when starting an operation such as copying. For the function button 8, frequently used functions are registered. The function button 8 is pressed when calling the registered functions.

The user terminal 300 is, for example, a smartphone, a tablet terminal, a personal computer, or the like. The user terminal 300 includes an imaging unit. In the user terminal 300, an application program for using the image forming system 1 is started to support the image forming system described above. It is assumed that an example of the user terminal 300 is a smartphone and an application program (application for using the image forming system) is running. The application for using the image forming system causes the user terminal 300 to read the two-dimensional information code displayed on the display 110 of the image forming apparatus 100 by using the imaging unit according to the user operation and to access the image forming apparatus 100 based on the read two-dimensional information code. The application for using the image forming system causes the user terminal 300 to acquire the image data corresponding to the two-dimensional information code from the accessed image forming apparatus 100.

(Operation of Image Forming System)

Figure 5:
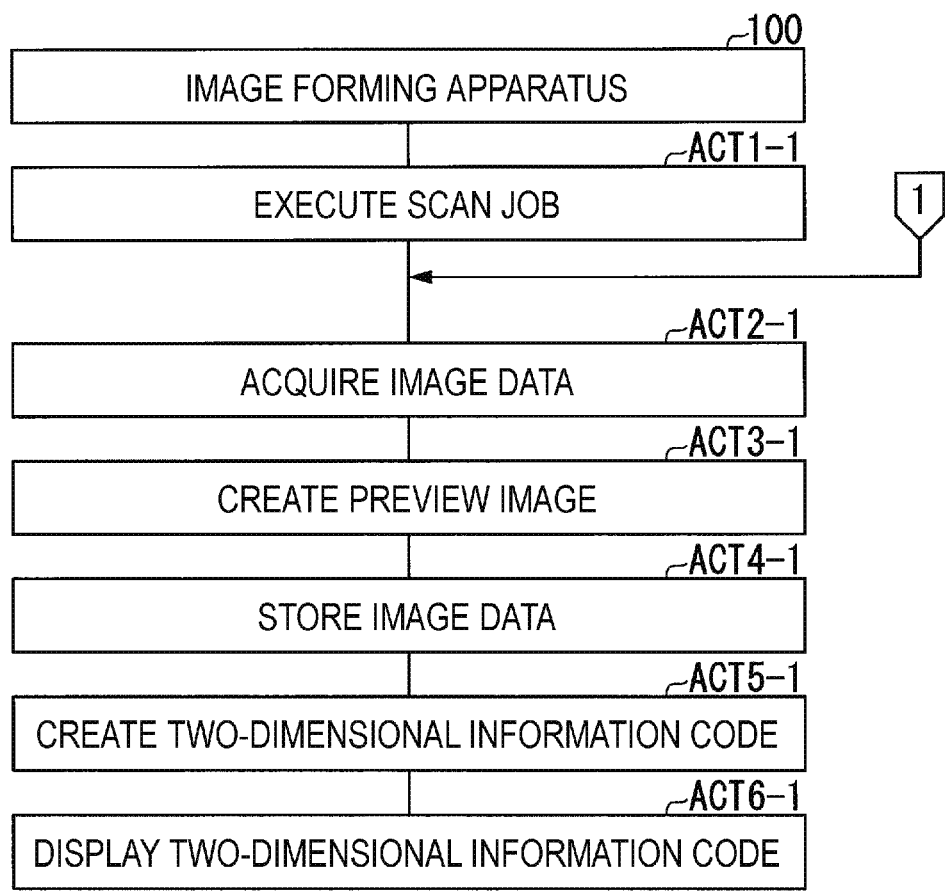
FIG. 5 is a sequence chart showing Example 1 of the processing flow of the image forming system according to at least one embodiment.

FIG. 5 is a sequence chart showing Example 1 of the processing flow of the image forming system 1 of at least one embodiment. In the example shown in FIG. 5, a case where the image forming apparatus 100 executes a scan job based on an operation performed by the user on the control panel 120 will be described.

In the image forming apparatus 100, the processing unit 1002 causes the scanner unit 155 to execute a scan job based on an operation performed by the user on the control panel 120 (ACT 1-1).

In the image forming apparatus 100, the processing unit 1002 acquires the image data created by the scanner unit 155 by executing the scan job (ACT 2-1).

In the image forming apparatus 100, the processing unit 1002 creates a preview image based on the acquired image data (ACT 3-1).

In the image forming apparatus 100, the processing unit 1002 stores the image data and the preview image data in association with each other in the storage device 153 (ACT 4-1).

In the image forming apparatus 100, the processing unit 1002 acquires a URL indicating a storage destination folder where the preview image stored in the storage device 153 is stored, and a file name.

In the image forming apparatus 100, the creating unit 1004 creates a two-dimensional information code such as a QR code, or a one-dimensional information code such as a barcode based on the URL acquired by the processing unit 1002 (ACT 5-1).

In the image forming apparatus 100, the output unit 1006 acquires the two-dimensional information code created by the creating unit 1004. The output unit 1006 outputs the acquired two-dimensional information code to the display 110.

The display 110 acquires the two-dimensional information code output by the output unit 1006 and displays the acquired two-dimensional information code (ACT 6-1).

Figure 6:
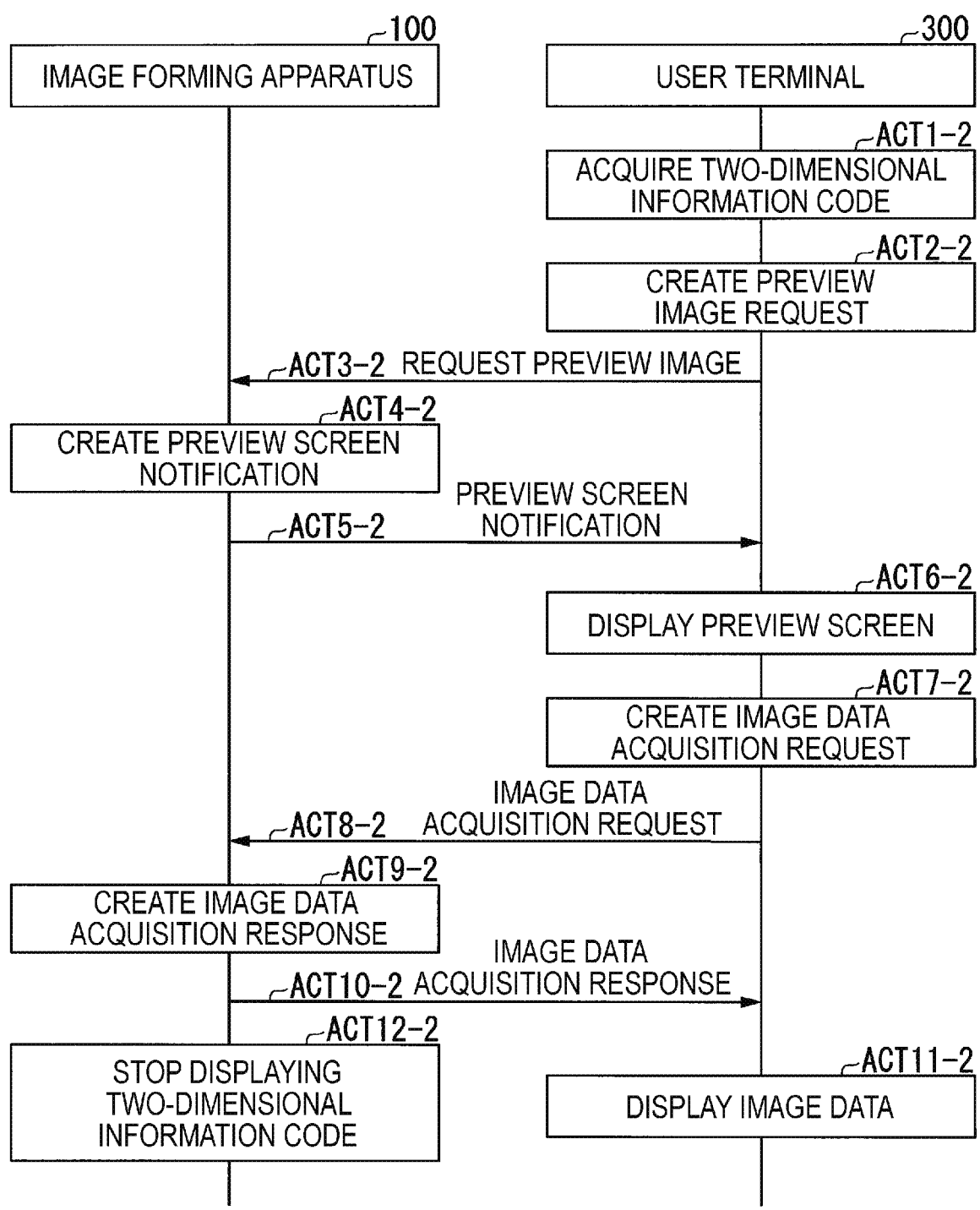
FIG. 6 is a sequence chart showing Example 2 of the processing flow of the image forming system according to at least one embodiment.

FIG. 6 is a sequence chart showing Example 2 of the processing flow of the image forming system 1 of at least one embodiment. FIG. 6 shows the operation after the operation shown in FIG. 5.

The user terminal 300 acquires the two-dimensional information code by reading the two-dimensional information code displayed on the display 110 of the image forming apparatus 100 (ACT 1-2).

The user terminal 300 creates a preview image request for requesting a preview image based on the acquired two-dimensional information code (ACT 2-2). For example, the user terminal 300 creates a preview image data request for requesting image data based on the URL indicated by the two-dimensional information code.

The user terminal 300 transmits the created preview image request to the image forming apparatus 100 (ACT 3-2).

In the image forming apparatus 100, the processing unit 1002 acquires a preview image request from the external interface 151. The processing unit 1002 acquires accessible preview image data based on the storage destination folder and the file name indicated by the URL specified in the acquired preview image request. The processing unit 1002 creates a preview screen for providing the acquired preview image data. The creating unit 1004 acquires the preview screen created by the processing unit 1002. The creating unit 1004 creates a preview screen notification including the acquired preview screen data and addressed to the user terminal 300 that transmitted the preview image request (ACT 4-2).

In the image forming apparatus 100, the creating unit 1004 outputs the created preview screen notification to the external interface 151. The external interface 151 acquires the preview screen notification output by the creating unit 1004 and transmits the acquired preview screen notification to the user terminal 300 (ACT 5-2).

The user terminal 300 receives the preview screen notification transmitted by the image forming apparatus 100. The user terminal 300 acquires the preview screen data included in the received preview screen notification. The user terminal 300 displays the acquired preview screen data by processing the acquired preview screen data (ACT 6-2).

The user terminal 300 creates an image data acquisition request including information indicating the file name of the selected preview image data and addressed to the image forming apparatus 100 by the user performing an operation of selecting the preview image data on the displayed preview screen (ACT 7-2).

The user terminal 300 transmits the created image data acquisition request to the image forming apparatus 100 (ACT 8-2).

In the image forming apparatus 100, the processing unit 1002 acquires an image data acquisition request from the external interface 151. The processing unit 1002 acquires the image data stored in association with the corresponding preview image data from the storage device 153 using the file name of the preview image data specified by the acquired image data acquisition request.

The creating unit 1004 acquires the image data acquired by the processing unit 1002. The creating unit 1004 creates an image data acquisition response including the acquired image data and addressed to the user terminal 300 that transmitted the image data acquisition request (ACT 9-2).

In the image forming apparatus 100, the creating unit 1004 outputs the created image data acquisition response to the external interface 151. The external interface 151 acquires the image data acquisition response output by the creating unit 1004 and transmits the acquired image data acquisition response to the user terminal 300 (ACT 10-2).

The user terminal 300 receives the image data acquisition response transmitted by the image forming apparatus 100. The user terminal 300 acquires the image data included in the received image data acquisition response. The user terminal 300 displays the image data by processing the acquired image data (ACT 11-2).

In the image forming apparatus 100, the output unit 1006 stops outputting the two-dimensional information code corresponding to the image data included in the image data acquisition response (ACT 12-2).

In at least one of the above-described embodiments, the case where the application program for using the image forming system 1 is installed in the user terminal 300 was described, but the present disclosure is not limited to this example. For example, a web browser may be installed in the user terminal 300. In this case, the user terminal 300 supports the image forming system described above by starting the web browser.

The user terminal 300 causes the imaging unit to read the two-dimensional information code displayed on the display 110 of the image forming apparatus 100 according to a user operation. The user terminal 300 accesses the image forming apparatus 100 by operating the web browser based on the two-dimensional information code read by the imaging unit. The user terminal 300 acquires the image data corresponding to the two-dimensional information code from the accessed image forming apparatus 100 by operating the web browser.

In the above-described at least one embodiment, the case where the image forming apparatus 100 creates a preview image of the image based on the image data was described, but the present disclosure is not limited to this example. For example, the image forming apparatus 100 may create preview image data while creating image data in a file format related to an electronic document by scanning the document.

In the above-described at least one embodiment, the case where the user terminal 300 receives an operation to instruct the subsequent processing of the user was described, but the present disclosure is not limited to this example. For example, the image forming apparatus 100 may receive an operation to instruct the subsequent processing of the user.

In the above-described embodiment, the case where the user terminal 300 creates an image data acquisition request including identification information such as a file name of the image data and addressed to the image forming apparatus 100 based on the operation to instruct the subsequent processing of the user was described, but the present disclosure is not limited to this example. For example, the user terminal 300 may cause the image forming apparatus 100 to perform printing based on an operation to instruct the subsequent processing of the user, or may cause the image forming apparatus 100 to transmit to the outside of the image forming apparatus 100 by FAX, Email, or the like.

In the above-described at least one embodiment, the creating unit 1004 of the image forming apparatus 100 may create a temporarily usable two-dimensional information code based on the URL acquired by the processing unit 1002 or may create a temporary two-dimensional information code.

In the above-described embodiment, the image forming apparatus 100 may transmit a preview image notification including image data of a preview image (thumbnail) with a reduced size to the user terminal 300. With this configuration, the processing load on the user terminal 300 can be reduced.

In the above-described at least one embodiment, if the output unit 1006 of the image forming apparatus 100 outputs the two-dimensional information code to the display 110 and the image data corresponding to the two-dimensional information code is transmitted to the user terminal 300 within a certain period of time, the image forming apparatus 100 may continue to store the image data.

On the other hand, if the output unit 1006 of the image forming apparatus 100 outputs the two-dimensional information code to the display 110 and the image data corresponding to the two-dimensional information code is not transmitted to the user terminal 300 within a certain period of time, the image forming apparatus 100 may delete the image data.

Further, if the user performs an operation to delete the two-dimensional information code output to the display 110 by the output unit 1006 of the image forming apparatus 100 and displayed on the display 110, the image forming apparatus 100 may delete the image data corresponding to the two-dimensional information code.

According to the image forming system 1 of at least one embodiment, the image forming apparatus 100 includes the processing unit 1002 that creates a preview image of an image created by executing a job and stores image data of the created preview image in the storage device 153 as a storage unit, the creating unit 1004 that creates an information code representing a storage area of the storage unit where the image data is stored, and the output unit 1006 that displays the information code created by the creating unit 1004 on the display 110 as a display unit. With this configuration, the user terminal 300 can display the preview image of the image by reading the information code displayed on the display 110. Thus, even if the display mounted on the image forming apparatus 100 is small, the user can confirm the image before printing or transmitting.

The creating unit 1004 creates a two-dimensional information code representing a storage area of the storage unit where the image data is stored. With this configuration, a two-dimensional information code such as a QR code can be created.

The user terminal 300 may display the preview image on a web browser by reading the information code. With this configuration, the preview image can be displayed using the web browser.

The user terminal 300 may display a preview image when the information code is read by the operation of the activated application. With this configuration, the preview image can be displayed using the application.

(Modification)

FIG. 1 can be applied to the configuration example of an image forming system 1a of a modification of at least one embodiment. The image forming system 1a includes an image forming apparatus 100a instead of the image forming apparatus 100, as compared with the image forming system 1 of the embodiment. The image forming apparatus 100a and the user terminal 300 are communicably connected to each other via the network 500.

The image forming apparatus 100a is an apparatus that forms an image using a consumable item. The image forming apparatus 100a is, for example, a multifunction peripheral.

The image forming apparatus 100a scans a document to create image data in a file format related to an electronic document. The image forming apparatus 100a stores the created image data.

The image forming apparatus 100a scans a document to create image data in a file format related to an electronic document. If the scanning is interrupted while scanning a document including a plurality of sheets, the image forming apparatus 100a creates image data of the number of scanned sheets until the scanning is interrupted.

The image forming apparatus 100a creates a preview image of the image based on the created image data. The image forming apparatus 100a stores the created image data and the preview image data in association with each other.

The image forming apparatus 100a acquires a URL indicating a storage destination folder where preview image data is stored and a file name. The image forming apparatus 100a creates a two-dimensional information code representing the acquired URL. The image forming apparatus 100a displays the created two-dimensional information code on the display.

The user terminal 300 includes an imaging unit. The imaging unit reads the two-dimensional information code displayed on the display of the image forming apparatus 100a and the user terminal 300 acquires the URL included in the two-dimensional information code read by the imaging unit. The user terminal 300 uses the acquired URL to create a preview image request for requesting a preview image to the image forming apparatus 100a. The user terminal 300 transmits the created preview image request to the image forming apparatus 100a.

The image forming apparatus 100a receives the preview image request transmitted by the user terminal 300. The image forming apparatus 100a creates a preview screen for providing an image corresponding to the preview image based on the received preview image request. The image forming apparatus 100a creates a preview screen notification including the screen data of the created preview screen and addressed to the user terminal 300. The image forming apparatus 100a transmits the created preview screen notification to the user terminal 300.

The user terminal 300 receives the preview screen notification transmitted by the image forming apparatus 100a. The user terminal 300 displays the preview screen by processing the preview screen data included in the received preview screen notification.

The user performs an operation to instruct processing such as acquiring an image corresponding to the preview image, with reference to the preview screen displayed on the user terminal 300. The user terminal 300 creates an image data acquisition request addressed to the image forming apparatus 100a, including identification information such as the file name of the image data of the image corresponding to the preview image, based on the operation to instruct the subsequent processing of the user. The user terminal 300 transmits the created image data acquisition request to the image forming apparatus 100a.

The image forming apparatus 100a receives the image data acquisition request transmitted by the user terminal 300. The image forming apparatus 100a acquires image data corresponding to the file name included in the received image data acquisition request. The image forming apparatus 100a creates an image data acquisition response including the acquired image data and addressed to the user terminal 300. The image forming apparatus 100a transmits the created image data acquisition response to the user terminal 300.

The user terminal 300 receives the image data acquisition response transmitted by the image forming apparatus 100a. The user terminal 300 acquires the image data included in the received image data acquisition response. The user terminal 300 displays the document by processing the acquired image data.

The image forming apparatus 100a different from that of the embodiment will be described in detail below.

FIG. 2 can be applied to the hardware block diagram of the image forming apparatus 100a according to the modification of the embodiment.

Figure 7:
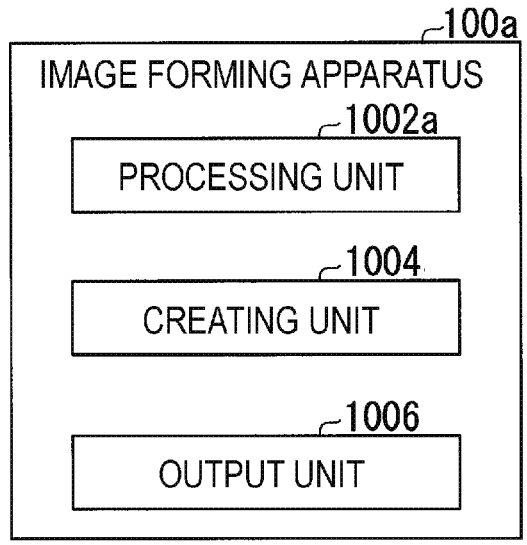
FIG. 7 is a diagram showing an example of a software configuration of an image forming apparatus according to a modification of at least one embodiment.

FIG. 7 is a diagram showing an example of a software configuration of the image forming apparatus 100a according to the modification of the embodiment. The software configuration shown in FIG. 7 is realized by the processor 154 of the image forming apparatus 100a processing the software program stored in the storage device 153 of the image forming apparatus 100a.

The processor 154 of the image forming apparatus 100a functions as a processing unit 1002a, the creating unit 1004, and the output unit 1006.

The processing unit 1002a causes the scanner unit 155 to execute a scan job or the printer unit 130 to execute a print job based on an operation performed by the user on the control panel 120. The processing unit 1002a acquires the image data created by the scanner unit 155 by executing the scan job. The processing unit 1002a acquires the image data created by the scanner unit 155 by executing the scan job until the scan interrupting operation is performed when the user performs an operation to interrupt the scan on the control panel 120.

The processing unit 1002a creates a preview image based on the acquired image data. The processing unit 1002a stores the image data of the image and the image data of the preview image in association with each other in the storage device 153.

The processing unit 1002a acquires information indicating a storage area where the image data of the preview image stored in the storage device 153 is stored. The description regarding a case where a URL is applied as an example of information indicating a storage area where image data of a preview image is stored. The URL may indicate the storage destination folder where the image data of the preview image is stored and the file name. Hereinafter, as an example, the case where the storage destination folder where the uploaded image data is stored, and the file name are indicated by the URL will be described.

The processing unit 1002a acquires a preview image request from the external interface 151. The processing unit 1002a acquires preview image data that can be accessed by the URL, based on the URL specified in the acquired preview image request. The processing unit 1002a creates a preview screen for providing the acquired preview image data.

The processing unit 1002a acquires an image data acquisition request from the external interface 151. The processing unit 1002a acquires the corresponding image data from the storage device 153 based on the storage destination folder and the file name specified by the acquired image data acquisition request.

(Operation of Image Forming System)

Figure 8:
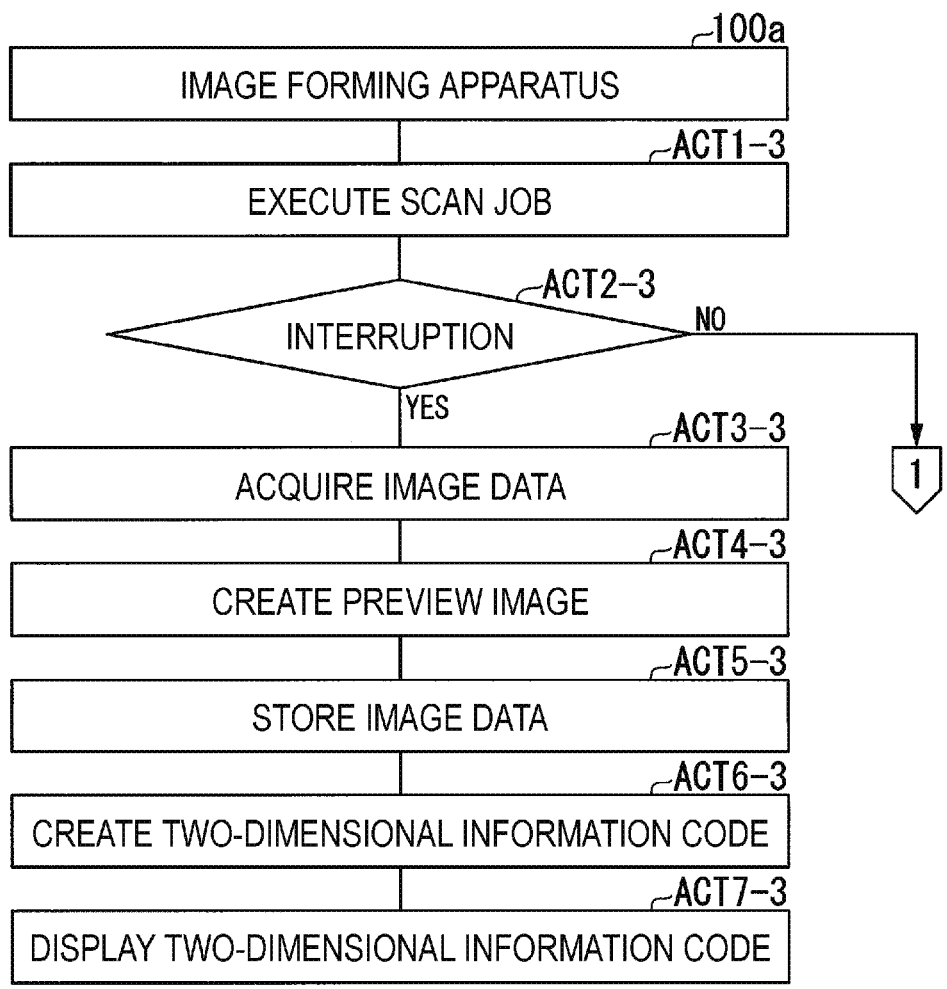
FIG. 8 is a sequence chart showing Example 1 of the processing flow of an image forming system according to the modification.

FIG. 8 is a sequence chart showing Example 1 of the processing flow of the image forming system 1a according to the modification of at least one embodiment. In the example shown in FIG. 8, a case where the image forming apparatus 100a executes a scan job based on an operation performed by the user on the control panel 120 will be described.

In the image forming apparatus 100a, the processing unit 1002a causes the scanner unit 155 to execute a scan job based on an operation performed by the user on the control panel 120 (ACT 1-3).

In the image forming apparatus 100a, the processing unit 1002a determines whether the user performed an operation to interrupt the scan on the control panel 120 (ACT 2-3). When it is determined that the operation to interrupt the scan was not performed, the processing unit 1002a proceeds to ACT 2-1 in FIG. 5.

In the image forming apparatus 100a, when it is determined that the user performed an operation to interrupt the scan on the control panel 120, the processing unit 1002a acquires the image data created by the scanner unit 155 by executing the scan job until the scan interrupting operation is performed (ACT 3-3).

In the image forming apparatus 100a, the processing unit 1002a creates a preview image based on the acquired image data (ACT 4-3).

In the image forming apparatus 100a, the processing unit 1002a stores the image data of the image and the image data of the preview image in association with each other in the storage device 153 (ACT 5-3).

In the image forming apparatus 100a, the processing unit 1002a acquires a URL indicating the storage destination folder where the image data of the preview image stored in the storage device 153 is stored, and the file name.

In the image forming apparatus 100a, the creating unit 1004 creates a two-dimensional information code such as a QR code, or a one-dimensional information code such as a barcode representing the URL acquired by the processing unit 1002a (ACT 6-3).

In the image forming apparatus 100a, the output unit 1006 acquires the two-dimensional information code created by the creating unit 1004. The output unit 1006 outputs the acquired two-dimensional information code to the display 110.

The display 110 acquires the two-dimensional information code output by the output unit 1006 and displays the acquired two-dimensional information code (ACT 7-3).

Figure 9:
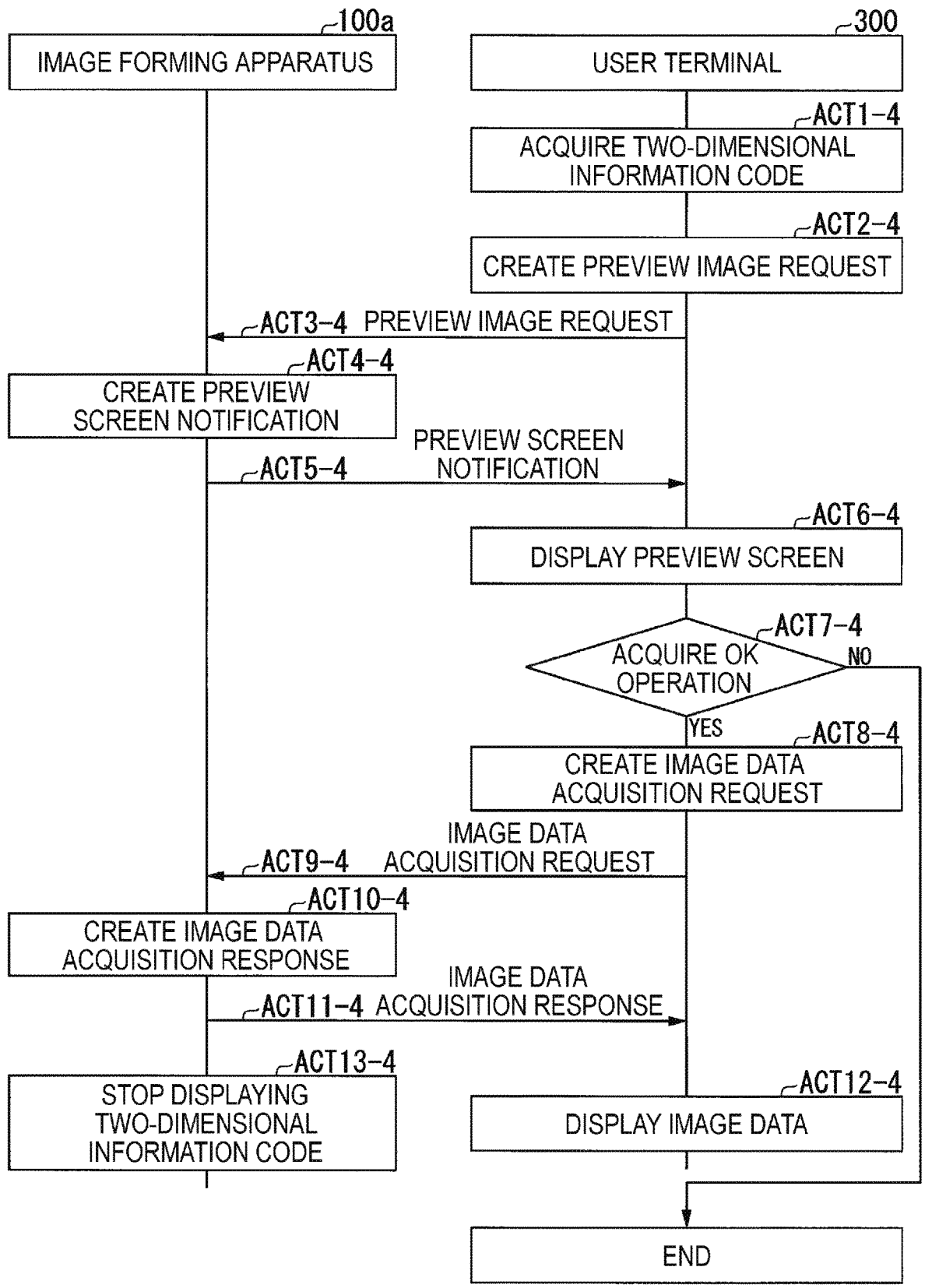
FIG. 9 is a sequence chart showing Example 2 of the processing flow of the image forming system according to the modification.

FIG. 9 is a sequence chart showing Example 2 of the processing flow of the image forming system 1a according to the modification of at least one embodiment. FIG. 9 shows an operation after the operation shown in FIG. 8.

The user terminal 300 acquires the two-dimensional information code by reading the two-dimensional information code displayed on the display 110 of the image forming apparatus 100 (ACT 1-4).

The user terminal 300 creates a preview image request for requesting a preview image based on the acquired two-dimensional information code (ACT 2-4). For example, the user terminal 300 creates a preview image request for requesting preview image data using the URL indicated by the two-dimensional information code.

The user terminal 300 transmits the created preview image request to the image forming apparatus 100a (ACT 3-4).

In the image forming apparatus 100a, the processing unit 1002a acquires a preview image request from the external interface 151. The processing unit 1002a acquires preview image data that can be accessed using the storage destination folder and the file name indicated by the URL specified by the acquired preview image request. The processing unit 1002a creates a preview screen for providing the acquired preview image data. The creating unit 1004 acquires the preview screen created by the processing unit 1002a. The creating unit 1004 creates a preview screen notification including the acquired preview screen data and addressed to the user terminal 300 that transmitted the preview image request (ACT 4-4).

In the image forming apparatus 100a, the creating unit 1004 outputs the created preview screen notification to the external interface 151. The external interface 151 acquires the preview screen notification output by the creating unit 1004 and transmits the acquired preview screen notification to the user terminal 300 (ACT 5-4).

The user terminal 300 receives the preview screen notification transmitted by the image forming apparatus 100a. The user terminal 300 acquires the preview screen data included in the received preview screen notification. The user terminal 300 displays the preview screen by processing the acquired preview screen data (ACT 6-4).

The user terminal 300 determines whether or not the user performed an approval operation such as pressing the OK button on the displayed preview screen (ACT 7-4). When the approval operation by the user was not performed, the processing ends.

When it is determined that the approval operation was performed, the user terminal 300 creates an image data acquisition request addressed to the image forming apparatus 100a, including information indicating the file name of the preview image data that is the target of the approval operation (ACT 8-4).

The user terminal 300 transmits the created image data acquisition request to the image forming apparatus 100 (ACT 9-4).

In the image forming apparatus 100a, the processing unit 1002a acquires an image data acquisition request from the external interface 151. The processing unit 1002a acquires the image data stored in association with the file name of the preview image data from the storage device 153 based on the file name of the preview image data specified by the acquired image data acquisition request.

The creating unit 1004 acquires the image data acquired by the processing unit 1002a. The creating unit 1004 creates an image data acquisition response including the acquired image data and addressed to the user terminal 300 that transmitted the image data acquisition request (ACT 10-4).

In the image forming apparatus 100a, the creating unit 1004 outputs the created image data acquisition response to the external interface 151. The external interface 151 acquires the image data acquisition response output by the creating unit 1004 and transmits the acquired image data acquisition response to the user terminal 300 (ACT 11-4).

The user terminal 300 receives the image data acquisition response transmitted by the image forming apparatus 100a. The user terminal 300 acquires the image data included in the received image data acquisition response. The user terminal 300 displays the image by processing the acquired image data (ACT 12-4).

In the image forming apparatus 100a, the output unit 1006 stops outputting the two-dimensional information code corresponding to the image data included in the image data acquisition response (ACT 13-4).

In the modification of the above-described at least one embodiments, the case where the user terminal 300 receives an approval operation performed by the user on the preview screen was described, but the present disclosure is not limited to this example. For example, the image forming apparatus 100a may receive an approval operation performed by the user on the preview screen.

According to the image forming system 1a of the modification of the embodiment, if the scanning is interrupted while scanning a document including a plurality of sheets, the image forming apparatus 100a creates image data of the number of sheets scanned until the scanning is interrupted. The image forming apparatus 100a creates a preview image of the image based on the created image data. The image forming apparatus 100a stores the created image data and the preview image data in association with each other.

The image forming apparatus 100a acquires a URL indicating a storage destination folder where preview image data is stored and a file name. The image forming apparatus 100a creates a two-dimensional information code of the acquired URL. The image forming apparatus 100a displays the created two-dimensional information code on the display. With this configuration, the user terminal 300 can display the preview image of the output image by reading the two-dimensional information code displayed on the display 110 even when the scanning is interrupted in the middle, and thus, the image can be checked before printing or transmitting.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure. For example, the above-described embodiments and the modification of the embodiments are not limited to the case where the image data obtained by scanning is acquired by the user terminal 300 but can be applied to the case of printing on paper or the like.

Although the embodiments of the present disclosure have been described in detail above with reference to the drawings, the specific configurations are not limited to these embodiments and include design changes and the like within the scope not departing from the gist of the present disclosure.

For example, a computer program for realizing the functions of the above-described devices may be recorded in a computer-readable recording medium, and the program recorded in this recording medium may be read and executed by a computer system. The "computer system" here may include an OS and hardware such as peripheral devices.

The "computer-readable recording medium" is a writable non-volatile memory such as a flexible disk, a magneto-optical disk, a ROM, a flash memory, or the like, a portable medium such as a digital versatile disc (DVD), and a storage device such as a hard disk built in the computer system.

Further, the "computer-readable recording medium" includes a medium that stores a program for a certain period of time, such as a volatile memory (for example, a dynamic random access memory (DRAM)) in a computer system that serves as a server or a client when a program is transmitted via a network such as the Internet or a communication line such as a telephone line.

The above program may be transmitted from a computer system that stores the program in a storage device or the like to another computer system via a transmission medium or by a transmission wave in the transmission medium. Here, the "transmission medium" for transmitting the program refers to a medium having a function of transmitting information, such as a network (communication network) such as the Internet or a communication line such as a telephone line.

Also, the above program may be for realizing some of the functions described above. Further, the above program may be a so-called differential file (differential program) that can realize the above-mentioned functions in combination with a program already recorded in the computer system.

What is claimed is:

1. An image forming apparatus comprising:
    a processor configured to:
        create a preview image of an image created by executing a job;
        store image data of the created preview image in a memory;
        create an information code representing a storage area of the memory where the image data is stored;
        display the information code created by the processor on a display;
        receive a preview image request containing information representing the storage area of the memory where the image data is stored;
        create a preview screen notification including a preview screen identified by the information representing the storage area of the memory where the image data is stored; and
        output the preview screen notification to a user terminal.

2. The apparatus according to claim 1, wherein the processor is configured to create a two-dimensional information code representing a storage area of the memory where the image data is stored.

3. The apparatus according to claim 2, wherein the two-dimensional information code is a QR code.

4. The apparatus according to claim 2, wherein the two-dimensional information code represents an acquired universal resource locator corresponding to the stored image data.

5. The apparatus according to claim 1, wherein the processor is configured to create a one-dimensional information code representing a storage area of the memory where the image data is stored.

6. The apparatus according to claim 5, wherein the two-dimensional information code is a bar code.

7. The apparatus according to claim 1, wherein the processor is configured to, upon the job being interrupted during the execution thereof, create a preview image of the image created until the job is interrupted and store the created image data of the preview image in the storage.

8. An image forming system comprising the apparatus according to claim 1, and a user terminal, wherein the user terminal is configured to display a preview image on a web browser by reading the information code.

9. The image forming system according to claim 8, wherein the user terminal is configured to create an image data acquisition request addressed to the image forming apparatus, the image data acquisition request including identification information identifying where the image data is stored.

10. The image forming system according to claim 9, wherein the identification information is a file name identifying where the image data is stored.

11. The image forming system according to claim 8, wherein the user terminal includes at least one of a smartphone, a tablet terminal, or a personal computer.

12. An image forming system comprising the apparatus according to claim 1, and a user terminal, wherein the user terminal is configured to display a preview image upon the information code being read by operating an activated application.

13. A method of operating an image forming apparatus, the method comprising:
    creating a preview image of an image created by executing a job;
    storing image data of the created preview image in a memory;
    creating an information code representing a storage area of the memory storage where the image data is stored;
    displaying on a display the information code created;

receiving a preview image request containing information representing the storage area of the memory where the image data is stored;

creating a preview screen notification including a preview screen identified by the information representing the storage area of the memory where the image data is stored; and outputting the preview screen notification to a user terminal.

\* \* \* \* \*